US012180759B2

(12) United States Patent
Andersen

(10) Patent No.: US 12,180,759 B2
(45) Date of Patent: Dec. 31, 2024

(54) CHILD PROOF LATCH AND METHOD OF FITTING

(71) Applicant: Jesper Birk Andersen, Hong Kong (CN)

(72) Inventor: Jesper Birk Andersen, Hong Kong (CN)

( * ) Notice: Subject to any disclaimer, the term of this patent is extended or adjusted under 35 U.S.C. 154(b) by 7 days.

(21) Appl. No.: 17/520,932

(22) Filed: Nov. 8, 2021

(65) Prior Publication Data

US 2022/0170299 A1 Jun. 2, 2022

(30) Foreign Application Priority Data

Nov. 9, 2020 (GB) ..................................... 2017639

(51) Int. Cl.
*E05C 1/12* (2006.01)
*E05C 1/00* (2006.01)
(Continued)

(52) U.S. Cl.
CPC ................ *E05C 1/12* (2013.01); *E05C 1/004* (2013.01); *E05C 1/10* (2013.01); *E05C 21/00* (2013.01)

(58) Field of Classification Search
CPC ........... Y10T 292/0836; Y10T 292/096; Y10T 292/1014; Y10T 292/0969;
(Continued)

(56) References Cited

U.S. PATENT DOCUMENTS 932,330 A * 8/1909 Rotchford ........... E05B 65/0075 292/DIG. 21
1,016,422 A 2/1912 Lauritsen
(Continued)

FOREIGN PATENT DOCUMENTS

CN 103255960 A * 8/2013 ............. E05B 63/20
CN 203257303 U 10/2013
(Continued)

OTHER PUBLICATIONS

Espacenet machine translation CN 108808480 claims and description Jun. 21, 2018 (Year: 2023).*
(Continued)

*Primary Examiner* — Christine M Mills
*Assistant Examiner* — Steven A Tullia
(74) *Attorney, Agent, or Firm* — Lippes Mathias LLP

(57) ABSTRACT

A child safety locking mechanism has first and second movable doors, a fixed frame, first and second latching means and a catching means, the first and second latching means each comprising a retractable rod retractable by unlocking means having secondary locking means which must be unlocked before the unlocking means operates and is unlocked by a rotating, sliding or pressing-in action, the unlocking means may be released by a rotating, sliding or pressing in action, and movement direction to unlock the secondary locking means is different to the movement direction to release the unlocking means. The retractable rod includes a gear rack, and the unlocking means includes a user engaging surface and is connected by a shaft to a gear wheel engaging the gear rack to slidably move the retracting rod when the engaging surface is rotated by an adult.

19 Claims, 18 Drawing Sheets

(51) Int. Cl.
*E05C 1/10* (2006.01)
*E05C 21/00* (2006.01)

(58) Field of Classification Search
CPC ......... Y10T 292/0993; Y10T 292/1018; Y10T 292/307; Y10T 292/68; E05C 1/12; E05C 1/004; E05C 1/10; E05C 21/00; E05C 1/085; E05C 1/00; E05C 1/08; E05C 17/505; Y10S 292/63; Y10S 292/53; Y10S 292/54; E05B 15/04
See application file for complete search history.

(56) References Cited

U.S. PATENT DOCUMENTS

| | | | | |
|---|---|---|---|---|
| 1,378,622 | A * | 5/1921 | Sarbij | E05B 17/2038 292/150 |
| 1,729,784 | A * | 10/1929 | Kemp | E05C 9/041 70/94 |
| 2,747,960 | A * | 5/1956 | Ambrosino | E05B 65/462 312/194 |
| 4,633,688 | A * | 1/1987 | Beudat | E05B 47/0012 70/279.1 |
| 4,819,463 | A * | 4/1989 | Jacobs | E05B 67/36 70/80 |
| 5,826,922 | A * | 10/1998 | Wernig | E05C 9/041 292/172 |
| 6,431,621 | B1 * | 8/2002 | De Groot | E05C 19/002 292/DIG. 17 |
| 8,336,930 | B2 * | 12/2012 | Liang | E05B 65/0841 292/DIG. 20 |
| 9,534,422 | B1 * | 1/2017 | Andersen | E05B 65/06 |
| 11,530,554 | B2 * | 12/2022 | Tubby | E05B 15/1607 |
| 11,680,425 | B2 * | 6/2023 | Marsden | A47B 88/57 292/143 |
| 11,761,240 | B2 * | 9/2023 | Zhang | E05B 37/163 70/286 |
| 2003/0067173 | A1 * | 4/2003 | Magnusson | E05C 17/48 292/164 |
| 2006/0076787 | A1 * | 4/2006 | Sundberg | E05B 65/0014 292/336.3 |
| 2006/0290141 | A1 * | 12/2006 | VanHellemont | E05B 63/0004 292/142 |
| 2007/0200356 | A1 * | 8/2007 | Thornton | E05B 85/22 292/165 |
| 2011/0088436 | A1 * | 4/2011 | Cioni | E05B 65/46 70/85 |
| 2013/0125389 | A1 * | 5/2013 | VanHellemont | E05C 1/06 292/145 |
| 2016/0215535 | A1 | 7/2016 | Prehn | |

FOREIGN PATENT DOCUMENTS

| | | | | | |
|---|---|---|---|---|---|
| CN | 108808480 | A | * | 11/2018 | E05B 15/10 |
| DE | 20018728 | U1 | * | 5/2001 | E05B 65/0014 |
| EP | 1518980 | A1 | * | 3/2005 | E05B 65/0042 |
| FR | 2345573 | A1 | * | 2/1976 | E05B 13/004 |
| GB | 2244311 | A | | 11/1991 | |
| GB | 2540653 | A | | 1/2017 | |
| GB | 2553270 | A | | 3/2018 | |
| JP | H10299308 | A | * | 5/1997 | E05B 63/20 |
| JP | 2002089119 | A | * | 3/2002 | E05C 19/18 |
| KR | 960002907 | Y1 | * | 11/1993 | E05B 15/04 |
| KR | 200378878 | Y1 | * | 12/2004 | E05C 1/12 |
| KR | 101088265 | B1 | * | 10/2011 | E05B 45/06 |
| KR | 101739932 | B1 | * | 4/2016 | E05B 65/0014 |

OTHER PUBLICATIONS

Great Britain Search Report for Application No. GB2017639.2 dated Jan. 25, 2021, 2 pages.

* cited by examiner

CHILD PROOF LATCH AND METHOD OF FITTING

REFERENCE TO RELATED APPLICATION

This application claims priority to and the benefit of UK patent application GB 2017639.2, filed Nov. 9, 2020 and entitled "CHILD PROOF LATCH AND METHOD OF FITTING", the entirety of which is hereby incorporated by reference.

The present invention relates to a latch for cupboards, cabinet doors and the like, and, more particularly, "child-proof" latches that include features which make them difficult to be actuated by small children.

BACKGROUND OF THE INVENTION

Cupboards are commonly used in daily life in kitchens, bedrooms, offices, etc, to store a wide range of articles, some of which may be harmful to children, Small children may also attempt to climb on, or even in, cupboards and cabinets in an effort to hide, Cupboards and cabinets may house many types of materials which may be potentially hazardous to children such as medicines, household cleaners, knives, tools, paint, etc.

To prevent young children from accessing these storage areas, numerous items have been patented and sold, most of a multi-piece assembly, Generally, some sort of a longitudinal member with a hook portion is attached to either side surface of a cupboard or cupboard handle to limit the amount the cupboard door may be opened. The hook portion may engage with the cupboard handles or fixings on the cupboard doors. A latch on the hook may be depressed to release the hook from the cupboard handles or fixings on the cupboard doors.

While the disengagement of the latch is relatively easy for an adult, the latches are intended to be difficult to manipulate by a child. However, since the actuation may be easily learned by an attentive child, the latch may soon prove inadequate.

In some cases, these hooks require at least two components, which need alignment dulling installation or adjustment after installation. These components generally include protrusions fixed to the cupboard door for the hook to latch around. This mechanism may further require a biasing member (springs, etc.) to bias the latch member against the hook member.

These hooks allow a certain amount of operability of the cupboard doors allowing their partial opening due the playability of the material used or a looseness of the fixing.

In addition, known locks tend to break off from their adhesive attachment to a cupboard surface.

In additional on known locks the force required to release the lock is either so high that it is difficult for some adults and yet is low enough that it is possible for a strong and determined child to release, so it is not effectively a child proof lock.

What is needed is a "child-proof" safety lock that is easy to install on at least one cupboard door, and that may not be partially opened and its contents kept secure from children and upon actuation by an adult, the contents may become accessible.

It is thus an object of the present invention to provide a latch and method of fitting which overcomes the above problems, and which is defined in the appended claims.

DETAILED DESCRIPTION

The present invention is described more fully hereinafter with reference to the accompanying drawings, in which preferred embodiments of the invention are shown in FIGS. 1 to 10. This invention, may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
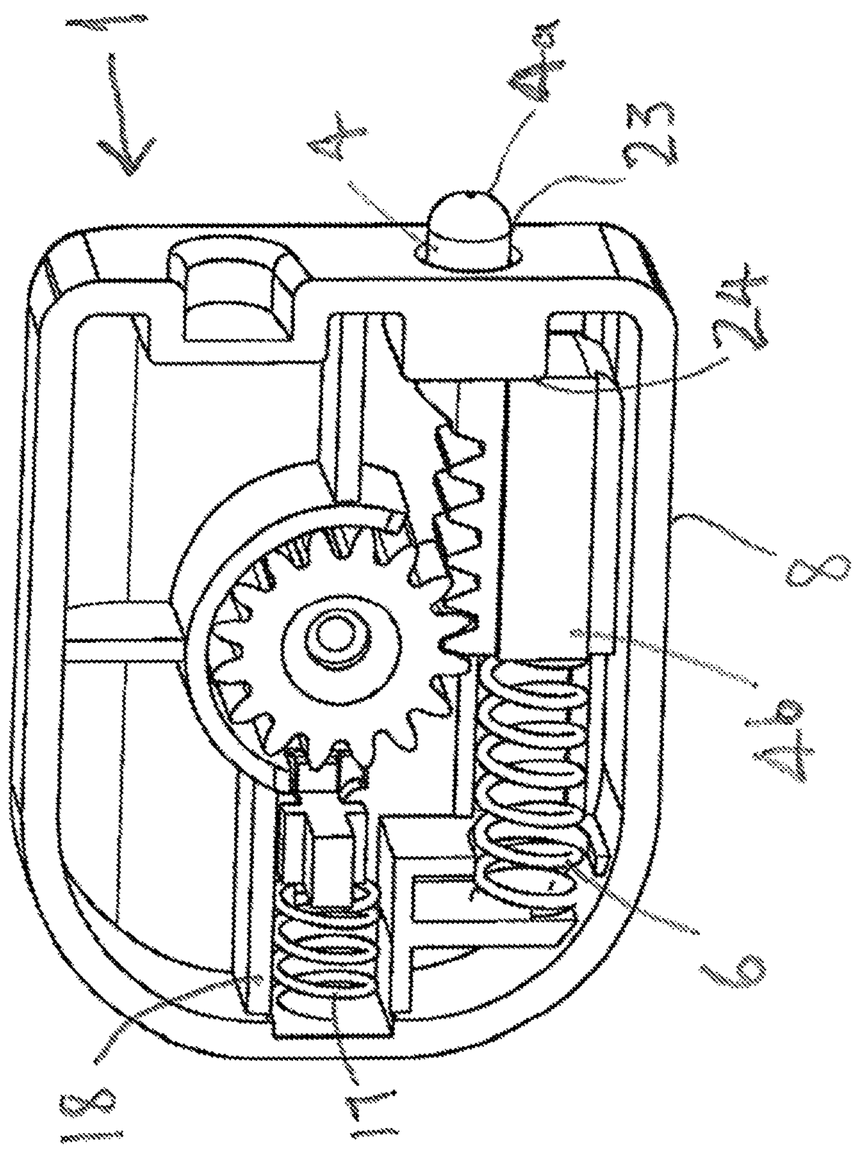
FIG. 1: shows a perspective view of an embodiment showing a front part of a lock mechanism of the invention with the front cover removed.
Figure 2:
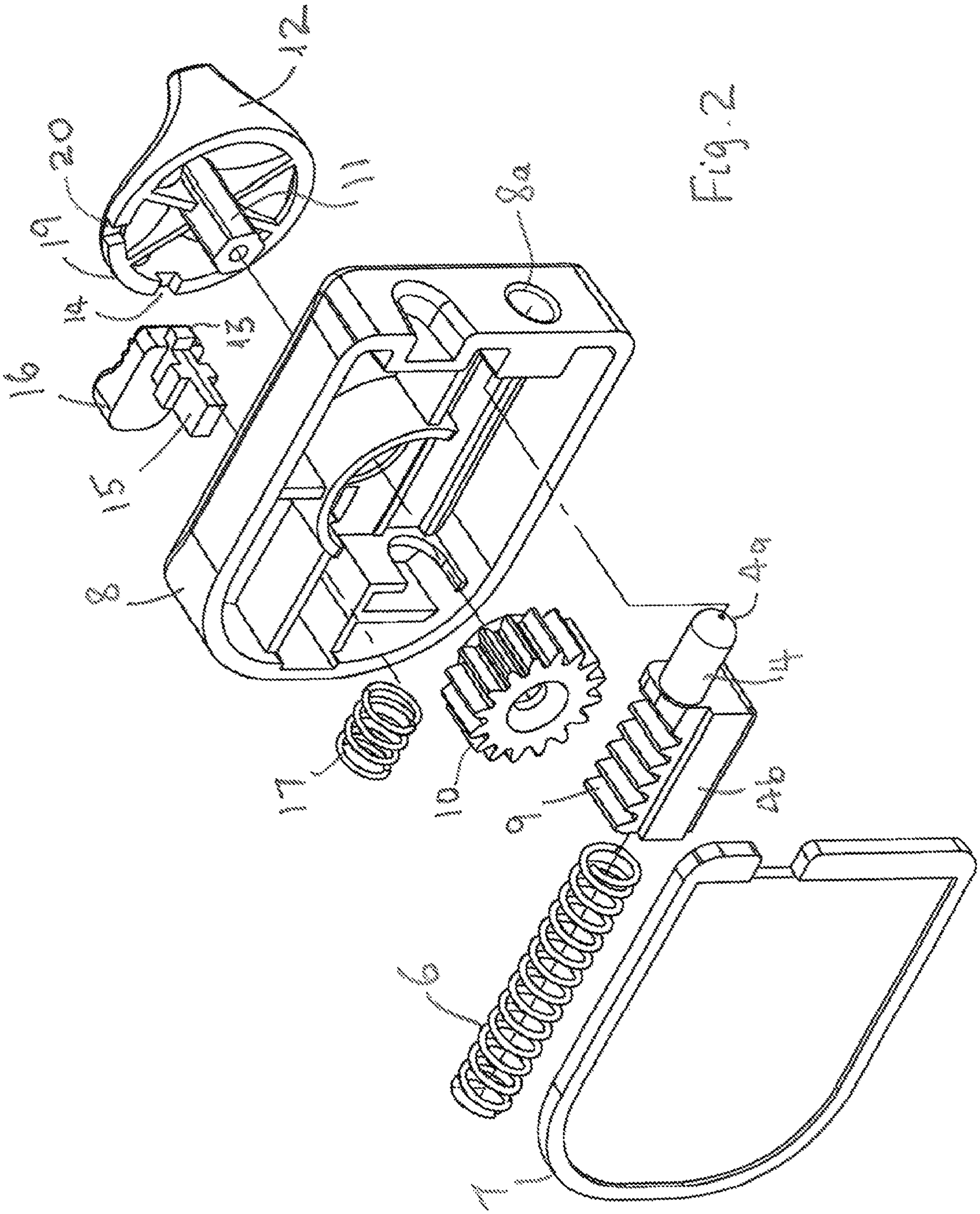
FIG. 2: shows a perspective view of the embodiment of FIG. 1 showing the components of the lock separated out.
Figure 3:
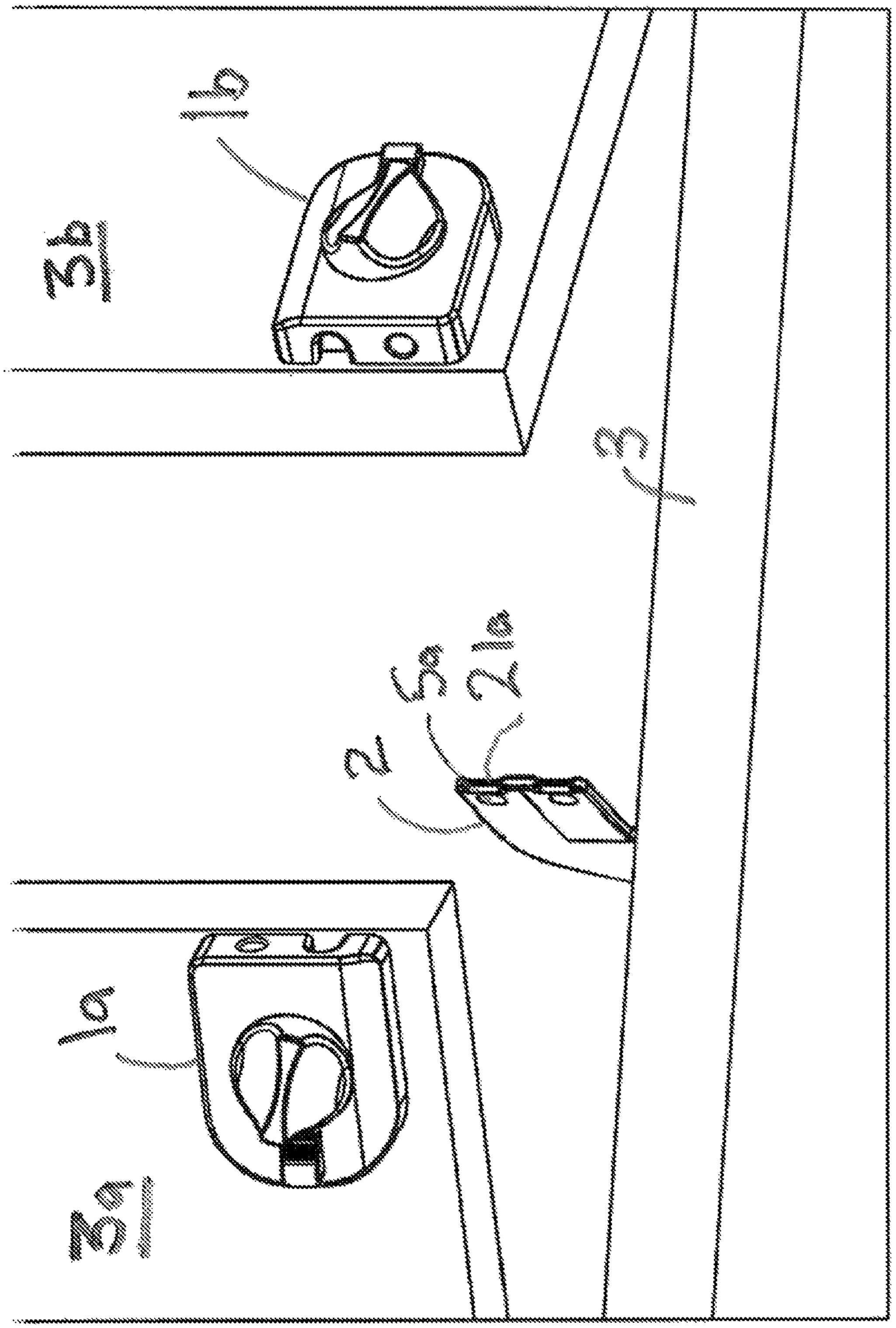
FIG. 3: shows a front perspective view of a pair of cupboard doors with a pair of locks of the embodiment of FIG. 1 fitted in place.
Figure 4:
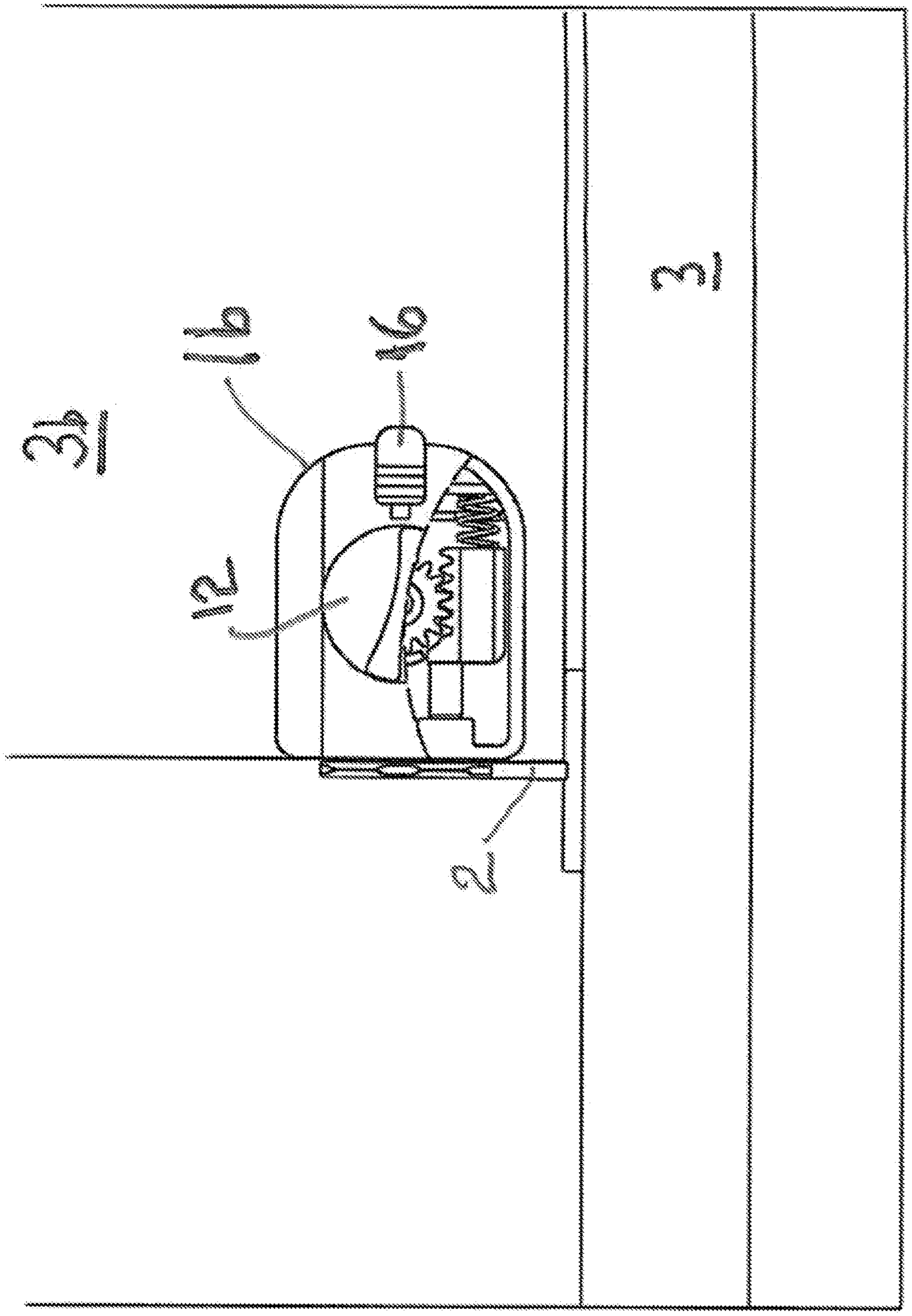
FIG. 4: shows a front view of the lock mechanism of FIG. 1 in the released position, with the cover partially removed.

Referring now to FIGS. 1 to 3, an embodiment of a childproof lock mechanism, according to the present invention, is illustrated in perspective view. The lock mechanism includes a latching means 1 with a housing 8 with an external cover 7 arranged to fit against the outside surface of the cupboard doors 3*a* and 3*b*, and a catching means 2 arranged to fit on the cupboard frame 3. In the embodiment shown in FIG. 3 there are a pair of latching means 1*a* and 1*b* and a single catching means 2 arranged between them.

The latching means 1 includes a housing 8, a cover 7, and a retractable rod 4 which, when the lock mechanism is fitted correctly, is arranged to extend out of the housing 8 through a hole 8*a* and into a recess 5 of the catching means 2 to effect the lock and retain the cupboard doors in their closed position. The retractable rod 4 is retractable by an adult user to release the latching means 1 from the catching means 2 to permit the cupboard door to be opened. In the embodiment shown in FIG. 3 the catching means to comprises first and second recesses 5*a* and 5*b* arranged one above the other to correspond with the retractable rods 4 of each latching means 1 arranged on the respective cupboard doors 3*a* and 3*b*.

A spring 6 is arranged at the opposing end of the retractable rod 4 which urges the rod 4 into the latched position extending from the latching means 1 and engaging with the recess 5*a*, 5*b* when in the closed position. The retractable rod 4 includes a first catch engaging end 4*a* and second opposite operating end 4*b* which includes a gear rack 9, and the user operable unlocking means 12 includes an operating button 12 with a user engaging surface and is connected by a shaft 11 to gear wheel 10 which engages the gear rack 9 to slidably move the retracting rod 4 when the engaging surface of the user operable unlocking means 12 is rotated by an adult user. The gear wheel 10 is thus rotatable by an adult user 2 to retract the rod 4 out of the engaged position in the corresponding recess 5*a*, 5*b* to enable the cupboard door to be opened. The shaft 11 is connected to a user operable unlocking means or operating button 12, which is rotatable by the user to retract the retractable rod 4 and so release the lock.

Furthermore, secondary lock means are provided by a locking peg 13 which is arranged to engage in a recess 14 located in the housing of the user operable unlocking means 12. The locking peg 13 is arranged on a slider 15 which is arranged to slide along a guide 18 formed in the housing 8 against a spring 17. The spring 17 urges the slider 15, and correspondingly the locking peg 13 into engagement with the recess 14 thus preventing rotation of the operating button 12. The slider 15 may be slidably moved by an adult user by operation of the operating button 16 to disengage the peg 13 from the recess 14 permitting the operating button 12 to be rotated by the adult user so disengaging the retractable rod 4. This two-step movement is significantly more difficult for a child to work out and yet is intuitive for an adult and the adult can be guided by instructions and by icons or arrows marked on the housing 8.

When the operating button 12 has been rotated the locking peg 13 bears against a circular contacting surface 19 of the operating button 12 remaining out of engagement and permitting continued rotation of the operating button 12 by an adult user. When the user releases the operating button 12 however the spring 6 is free to urge the retractable rod 4 back out to the extended position which rotates the gear 10 which in turn rotates the operating button 12 back to the extended position in which the locking peg 13 is once more aligned with the recess 14 and the secondary lock spring 17 urges the locking peg 13 automatically back into the recess 14. In this way the lock is automatically reset to the safe and childproof position when the adult user has released the opening button 12. The adult user can therefore remain confident that the childproof lock will be restored to the active locked status, once released.

An additional recess 20 is provided on the operating button 12 and arranged in such a position that the user can if, it chose to do so, rotate the operating button 12 to this position in which the locking peg 13 is aligned with the additional recess 20 which has the effect of permanently locking the operating button 12 in a position in which the retractable rod 4 is retracted from engagement with the recess 5*a*, 5*b*, in the catch means 2 and the childproof lock is effectively disabled. This is useful for adults who are responsible for small children on an occasional basis and in the meantime wish the cupboard to be operatable in a normal way.

Figure 5:
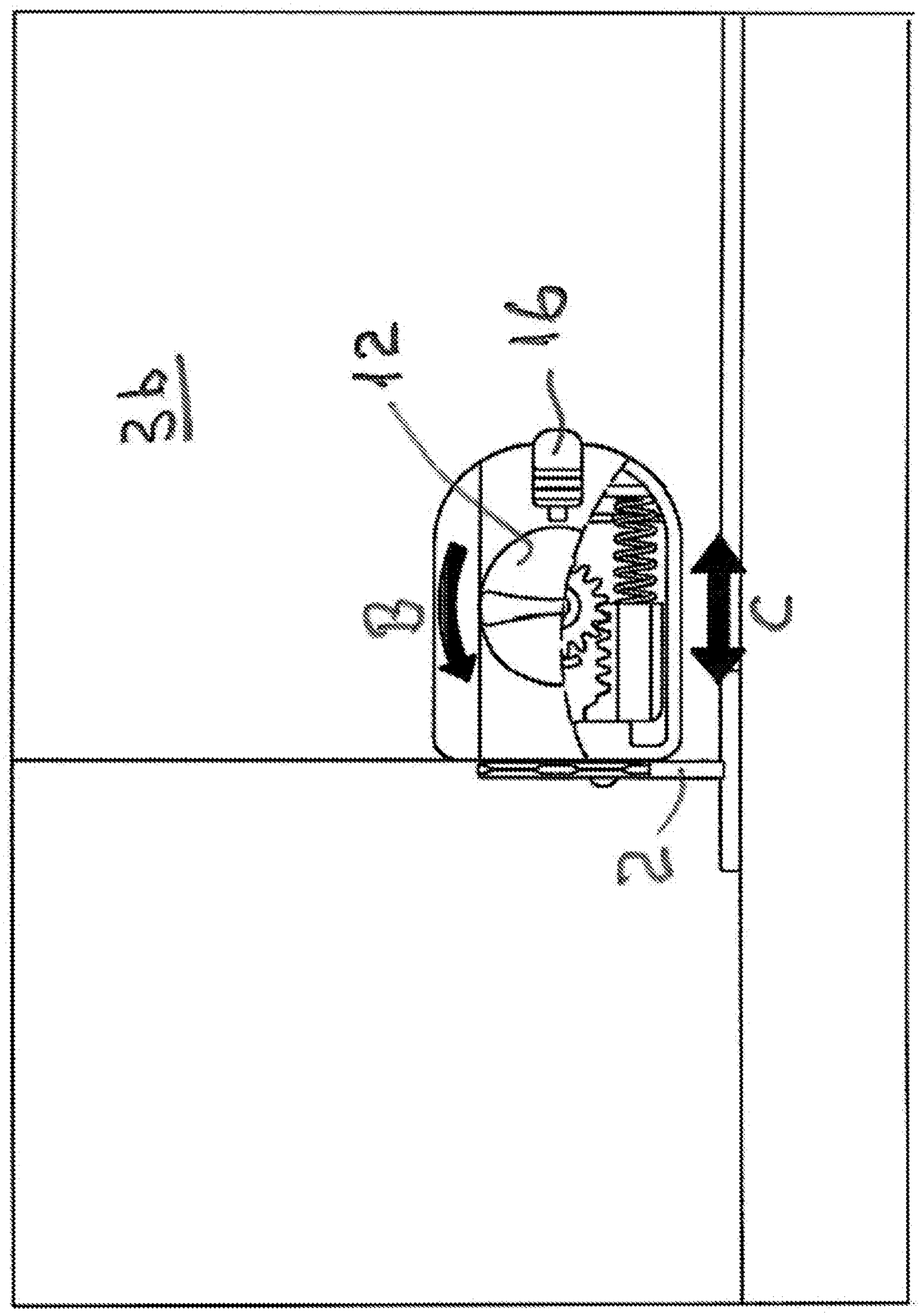
FIG. 5: shows a front view of the lock mechanism of FIG. 1 in the partially released position, with the cover partially removed.
Figure 6:
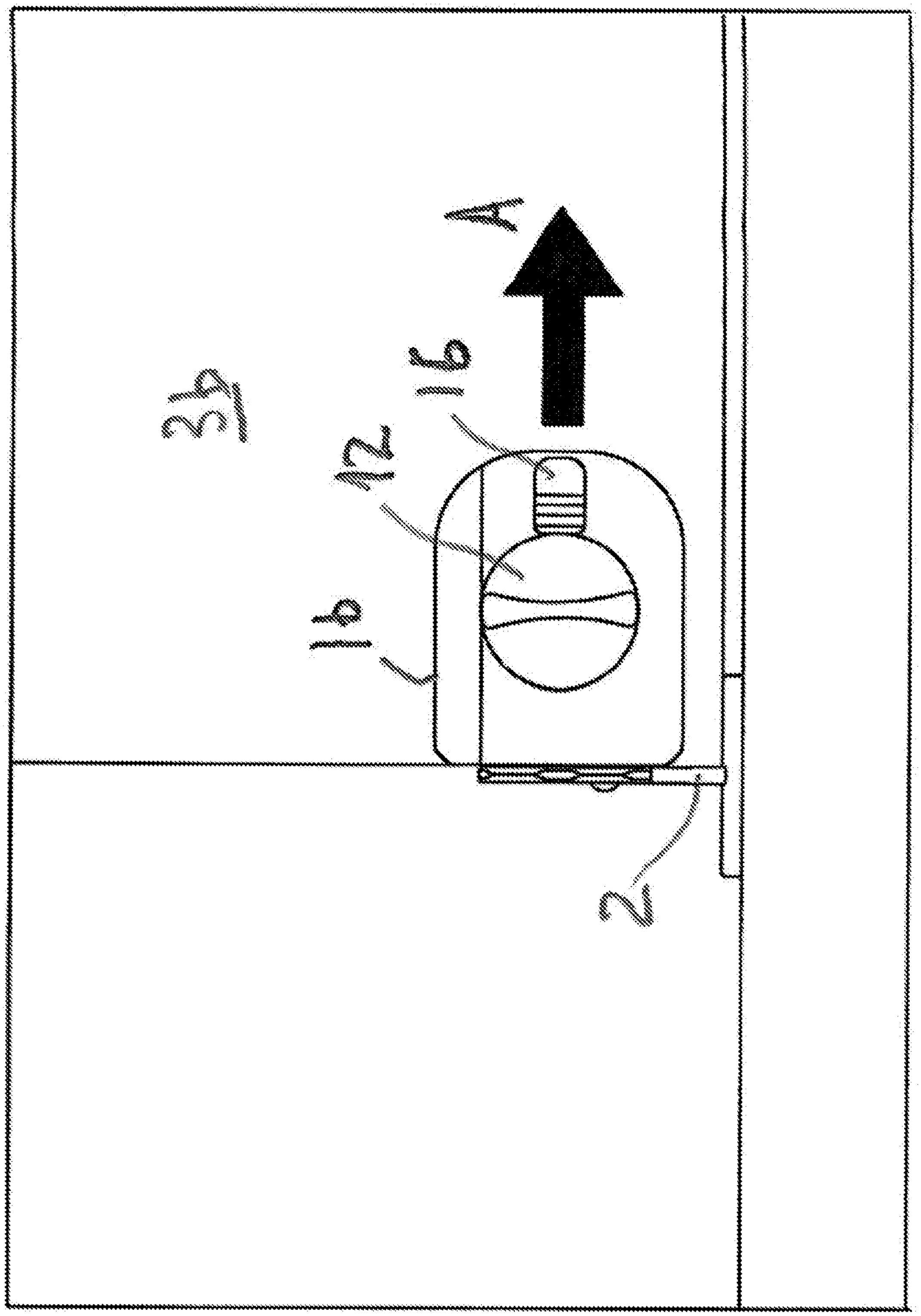
FIG. 6: shows a front view of the lock mechanism of FIG. 1 in the unreleased position, with the cover partially removed.

During normal operation of the lock the user will initially slide the secondary lock button 16 sideways in the direction of arrow A as shown in FIG. 6. Following that the user will then rotate the operating button 12 in the direction of arrow B as shown in FIG. 5 which will have the effect of slidingly retracting the retractable rod 4 in the direction of arrow C to the right as shown in FIG. 5. The cupboard door will then be free to be opened.

Figure 7:
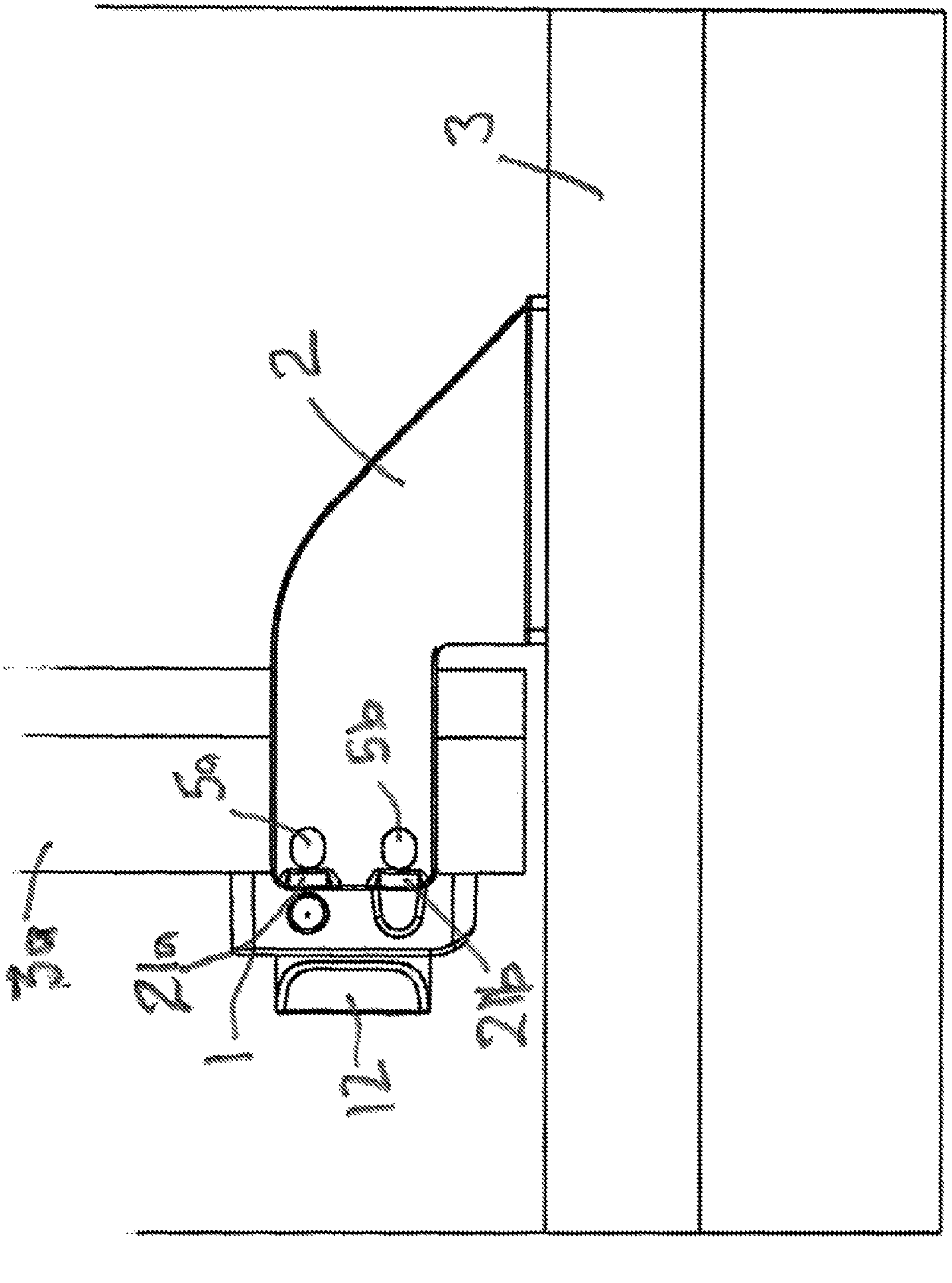
FIG. 7: shows a side view of one lock mechanism of FIG. 1 in the released position.
Figure 8:
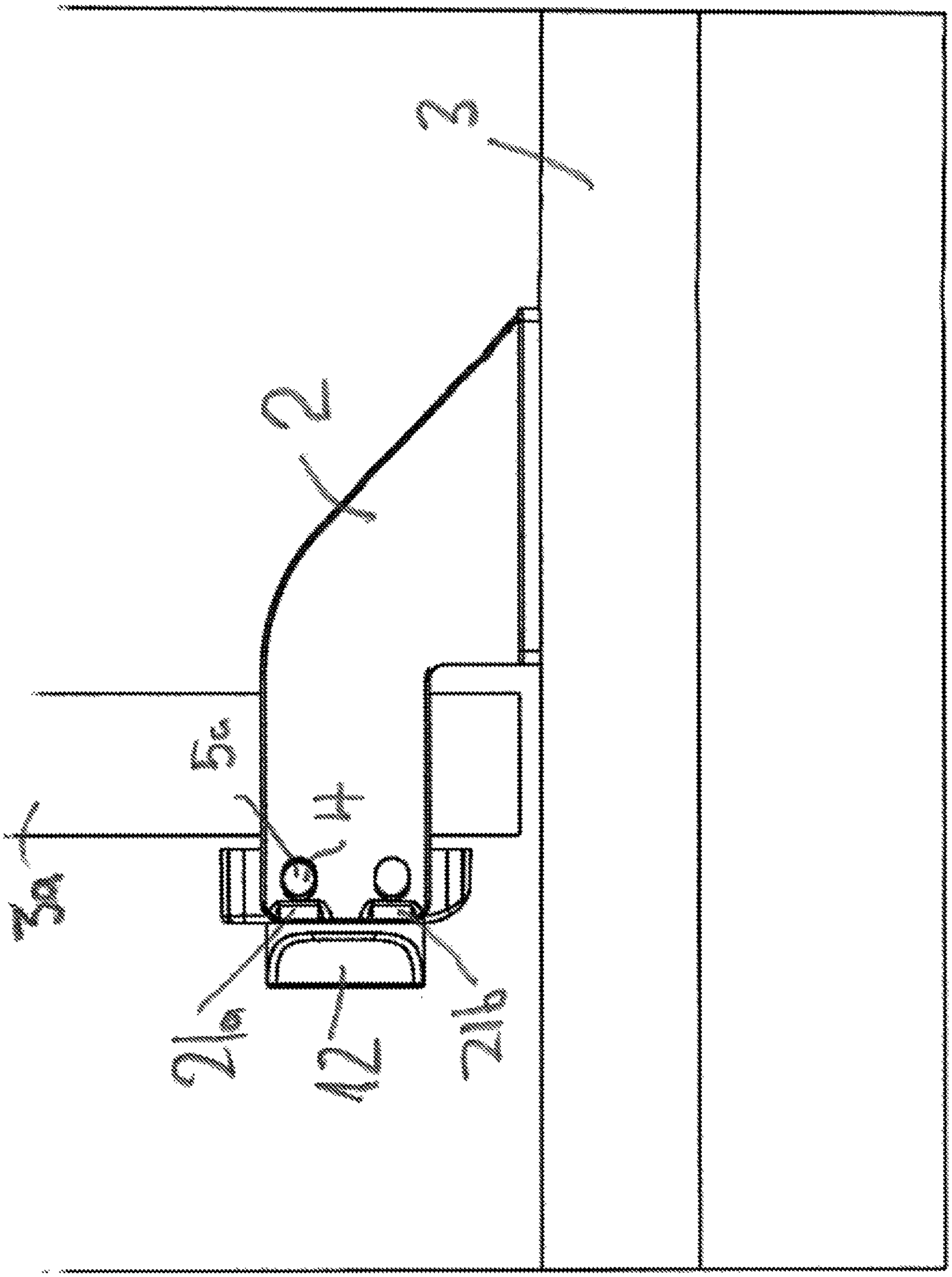
FIG. 8: shows a side view of one lock mechanism of FIG. 1 in the unreleased, locked position.
Figure 9:
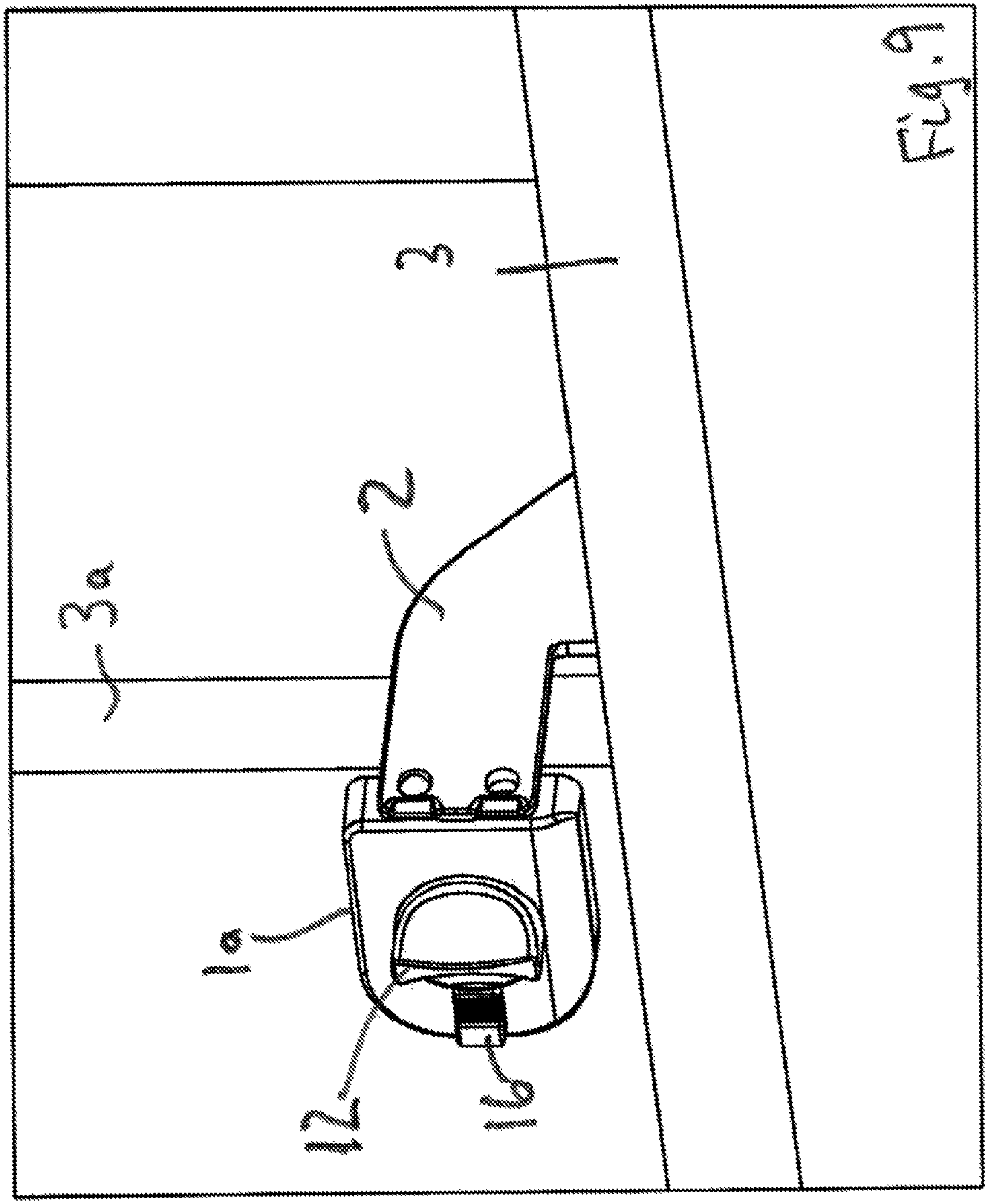
FIG. 9: shows a perspective view of one lock mechanism of FIG. 1 in the released position.

As can best be seen from FIG. 7 the respective recesses 5*a* and 5*b* of the catch means 2 also include corresponding bevelled surfaces 21*a*, 21*b* which extend from a leading edge of the catch means 2 to the recesses 5*a* and 5*b* such that, when the doors 3*a*, 3*b* are closed by the user, the retractable rod 4 first meets the thinner end of the bevel 21*a*, 21*b* and is retracted against the spring 6 as the retractable rod 4 continues to engage the bevel 21*a*, 21*b* before, finally, the extendable rod is urged into the recess 5*a*, 5*b* by the spring 6 when the rod 4 is aligned with the recess 5*a*, 5*b*, when the door is finally closed. This permits the smooth closing of the cupboard doors 3*a*, 3*b* by the adult user without having to engage the lock at all, but merely by pushing against the cupboard door 3*a*, 3*b* in a usual way. FIG. 8 and FIG. 9 show the cupboard door 3*a* in this closed and child lock activated position. In these views only one locking means or latching means one is shown whereas it will be understood that either one or a pair of latching means 1 could be used for the same catch means 2

Figure 10:
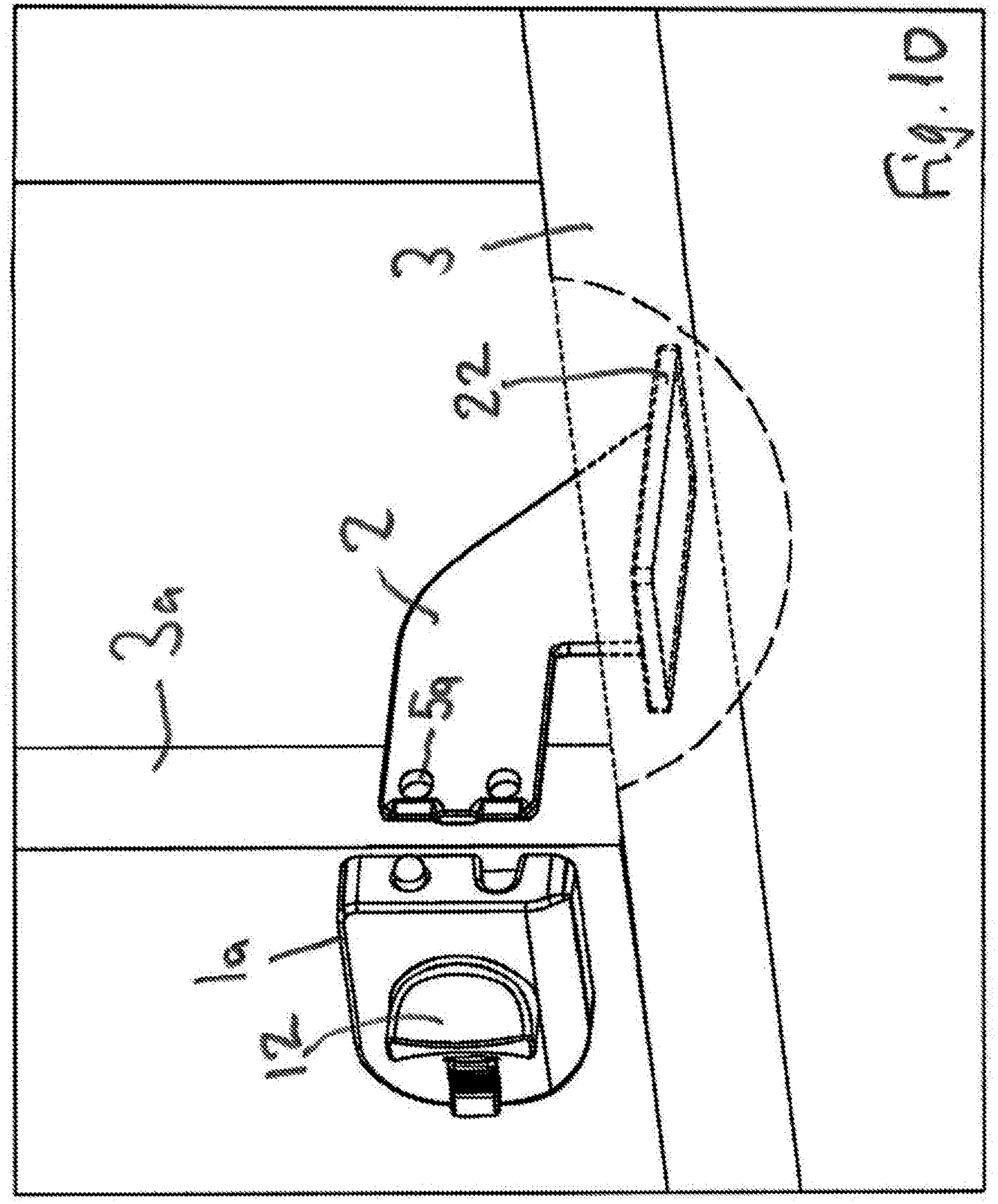
FIG. 10: shows a perspective view of one lock mechanism of FIG. 1 in the released position with the cupboard door open.
Figure 11:
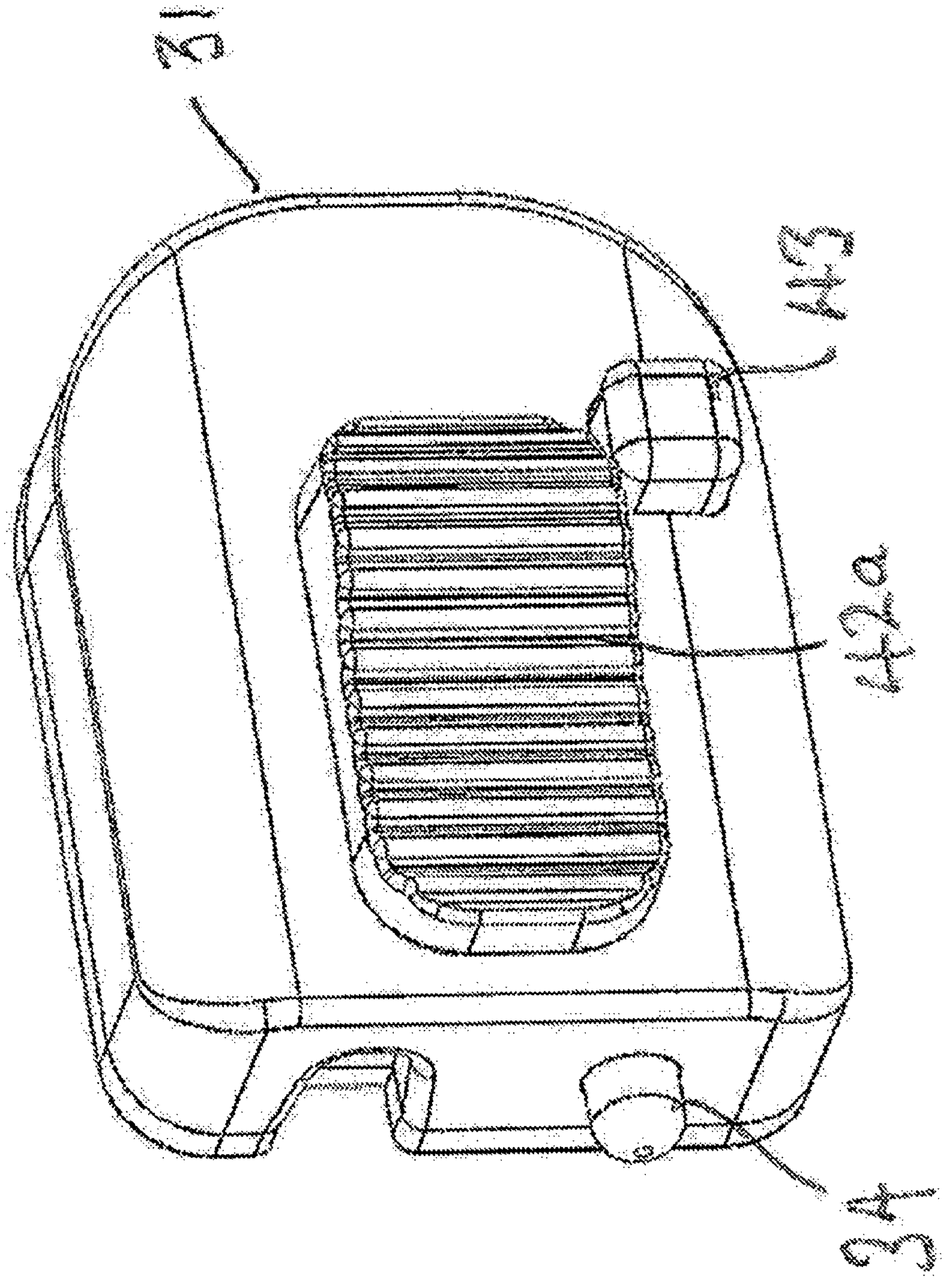
FIG. 11 shows a perspective view of a further embodiment of the lock mechanism of the invention.
Figure 12:
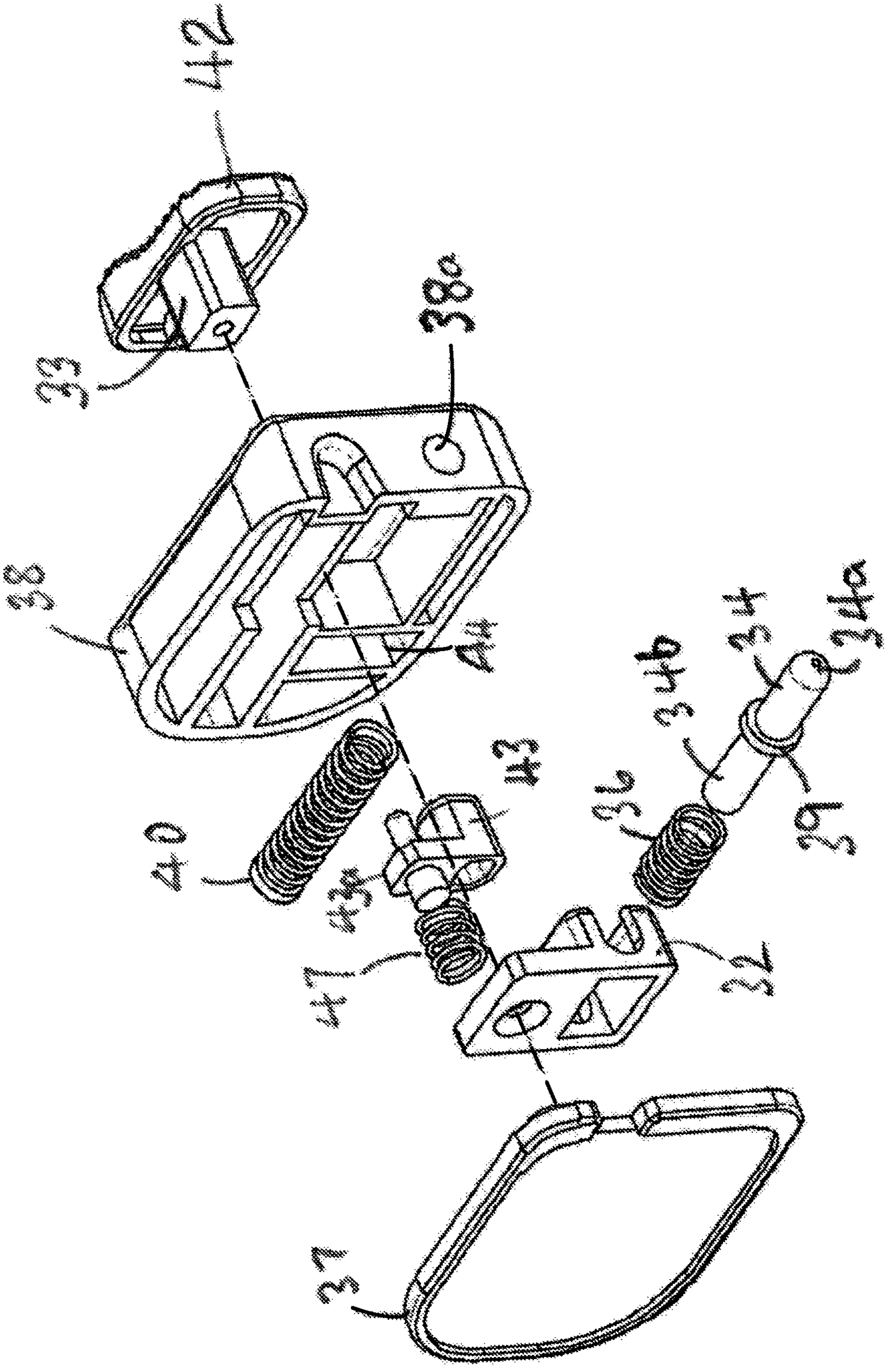
FIG. 12 shows a perspective view of the embodiment of FIG. 11 showing the components of the lock separated out.

Referring now to FIG. 10 a method of fitting the locking mechanism of the invention is also disclosed herein in which the user is able to easily fit the lock in a way which makes the lock effective and robust. As previously indicated the problem with current locks is that they may be damaged by the action of opening and closing the doors during use and this usually arises from the locks being fitted too close to the edge of the cupboard door so that when a pair of doors is closed or opened together the lock a abuts against the catching means too tightly. Conversely when the lock is fitted too far away from the edge of the cupboard door then the lock will be ineffective and likely to be breached buy incidental attempts to open the cupboard door without unlocking the lock and this having occurred once will be more likely to occur further time and the lock essentially ceases to be effective at all. Thus, it is of great importance to make sure that the lock is in the correct position with respect to the edge of a cupboard door, and, also in relation to the opposing cupboard door. It will be appreciated that cupboard doors in different households will be fitted in a different manner and the gap between the respective doors will vary significantly.

The catching means 2 includes a securing plate 22 which includes holes 25 provided for attachment to the inside surface of a cupboard with mechanical fasteners, such as screws. Double-sided adhesive tape or hook-and-loop type fasteners, such as Velcro® may also be used.

The user may fit the catching means 2 to a cupboard frame or carcass in a position which is between the cupboard doors 3*a* and 3*b* in the closed position. The user then presents the unfitted latching means 1 to the surface of the cupboard door 3*a* or 3*b* a in the desired position with the retractable rod 4 extended and located in the corresponding hole 5*a*. An indication mark 23 is located at the end of the retractable rod 4 which if viewable by the user when viewed from the opposite side of the hole 5*a*, indicates to the user that the latching means 1 is in the optimal position in relation to the catching means 2. The user may adjust the position of the latching means 1 so that the indication mark 23 is viewable and the fixing of the latching means 1 to the cupboard door 3*a* may then be preceded with in that position.

Referring now to FIGS. 11-18 a further embodiment of the lock mechanism of the invention is shown. Corresponding parts have the same numerical identifiers. In this embodiment the lock mechanism includes a latching means 31 with a housing 38 with an external cover 37 arranged to fit against the outside surface of the cupboard doors 3*a* and 3*b*, and a catching means 2 arranged to fit on the cupboard frame 3.

The latching means 31 also includes a retractable rod 34 which, when the lock mechanism is fitted correctly, is arranged to extend out of the housing 38 through a hole 38*a* and into a recess 5 of the catching means 2 to effect the lock and retain the cupboard doors in their closed position. The retractable rod 34 is retractable by an adult user to release the latching means 31 from the catching means 2 to permit the cupboard door to be opened.

A spring 36 is arranged at the opposing end of the retractable rod 34 which urges the rod 34 into the latched position extending from the latching means 31 and engaging with the recess 5*a*, 5*b* when in the closed position. The retractable rod 34 includes a first catch engaging end 34*a* and second opposite operating end 34*b* and which includes a flange 39, which engages with a movable carriage 32 and the user operable unlocking means 42 includes a slidable operating button 42*a* with a user engaging surface and is connected by a shaft 33 to an opening 35 in the moveable carriage 32 which causes the moveable carriage 32 to slidably move the retracting rod 34 when the engaging surface of the user operable unlocking means 42 is slidably moved by an adult user. The operating button 42*a* is thus slidable by an adult user to retract the rod 4 out of the engaged position in the corresponding recess 5*a*, 5*b* to enable the cupboard door to be opened. A locking button spring 40 acts on the operable unlocking means 42 urging it to the locked position.

Furthermore, in this embodiment, secondary lock means are provided by a locking peg 43 which comprises an abutment arm 43*a* which is arranged to abut against the moveable carriage 32 to prevent its movement to unlock the latching means. The locking peg 43 is arranged in a guide 44 which located in the housing 38 such that the locking peg 43 is arranged to slide in the housing 38 against a spring 47. The spring 47 urges the locking peg 43 into abutment against the moveable carriage 32 thus preventing sliding of the operable unlocking means 42*a*.

Figure 13A:
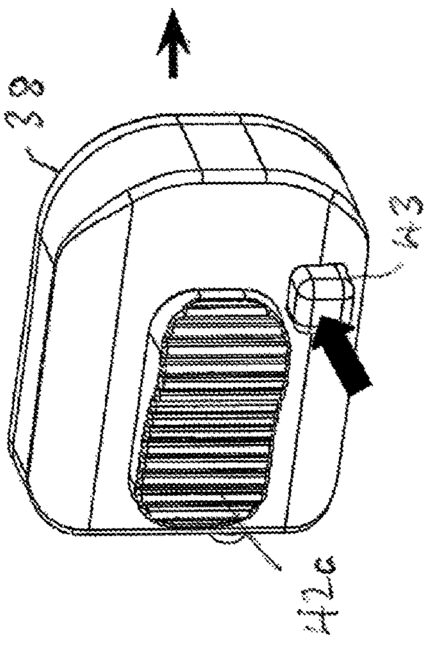
FIGS. 13A-13E show the steps of operation of the lock mechanism of the embodiment in FIG. 11.
Figure 13B:
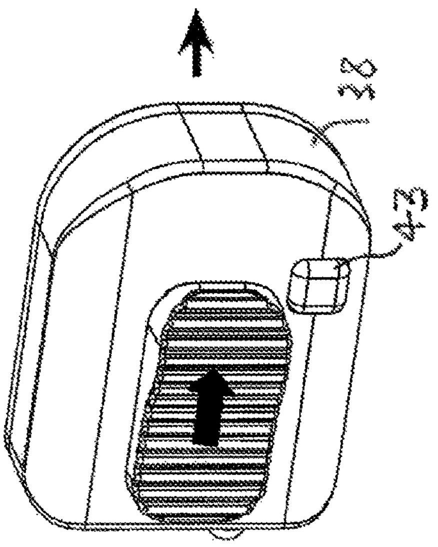
Figure 13C:
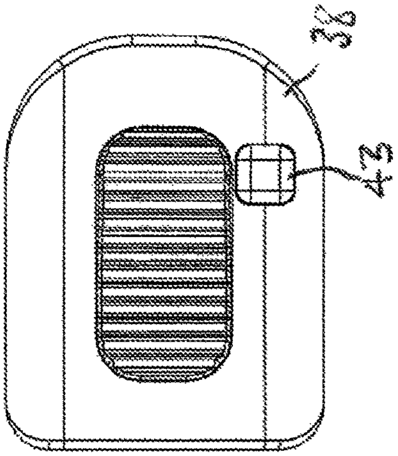
Figure 15:
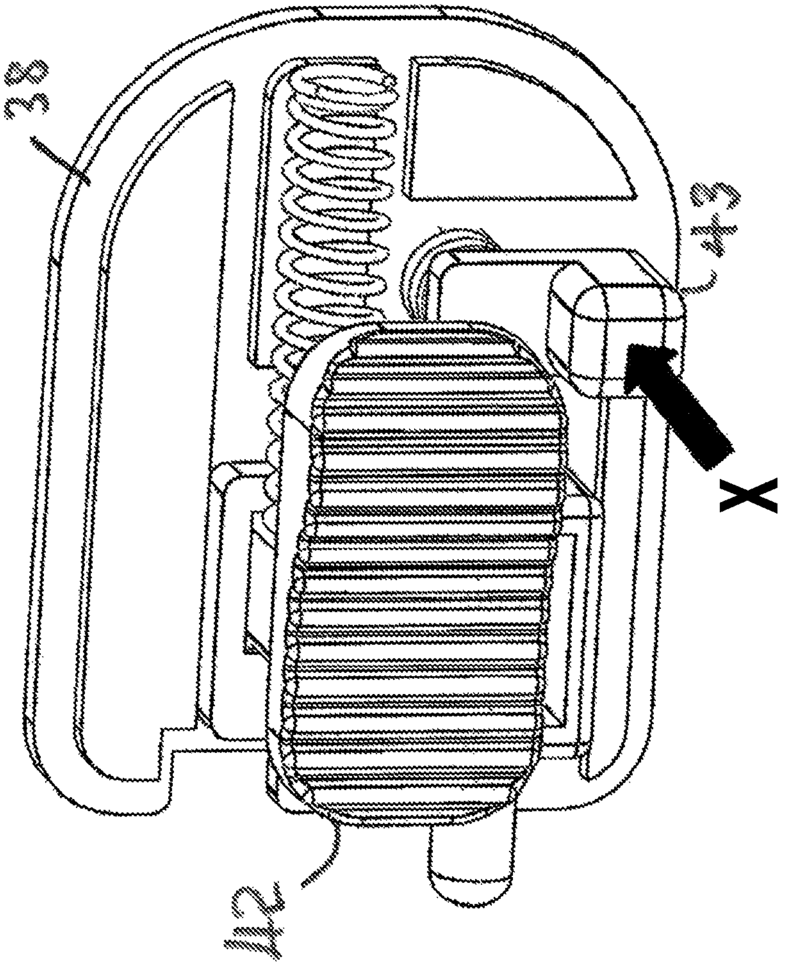
FIG. 15 shows a view of the interior of the lock mechanism of FIG. 11 with the unlocking means in a first position.
Figure 16:
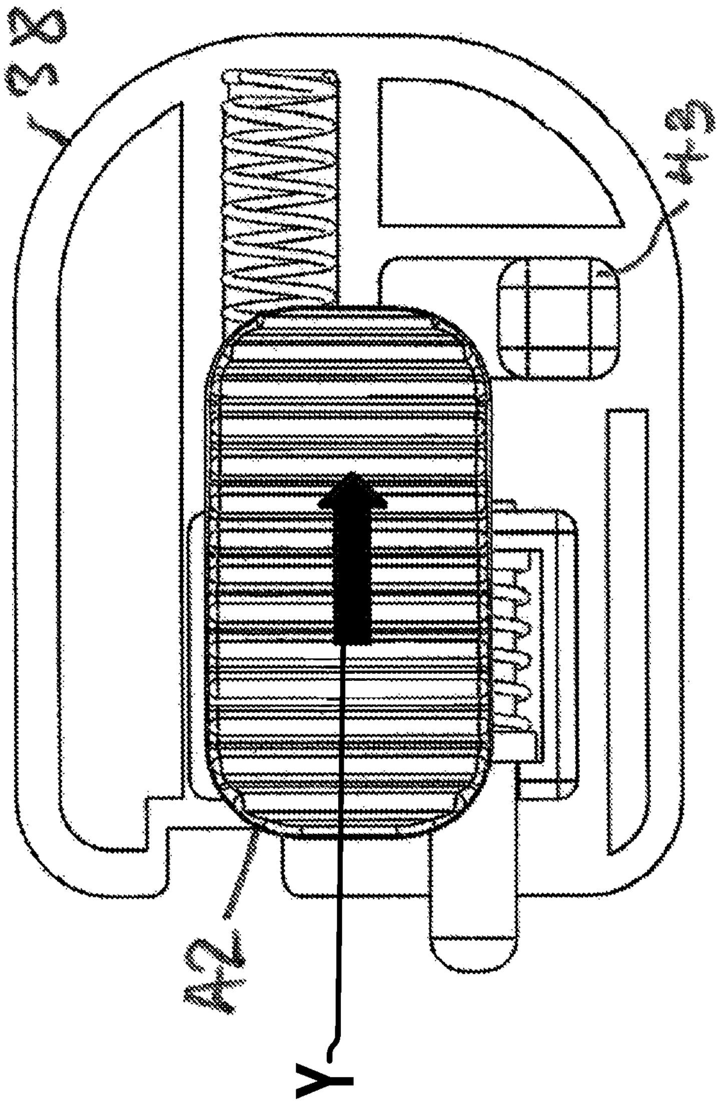
FIG. 16 shows a view of the interior of the lock mechanism of FIG. 11 with the unlocking means in a second position.
Figure 17:
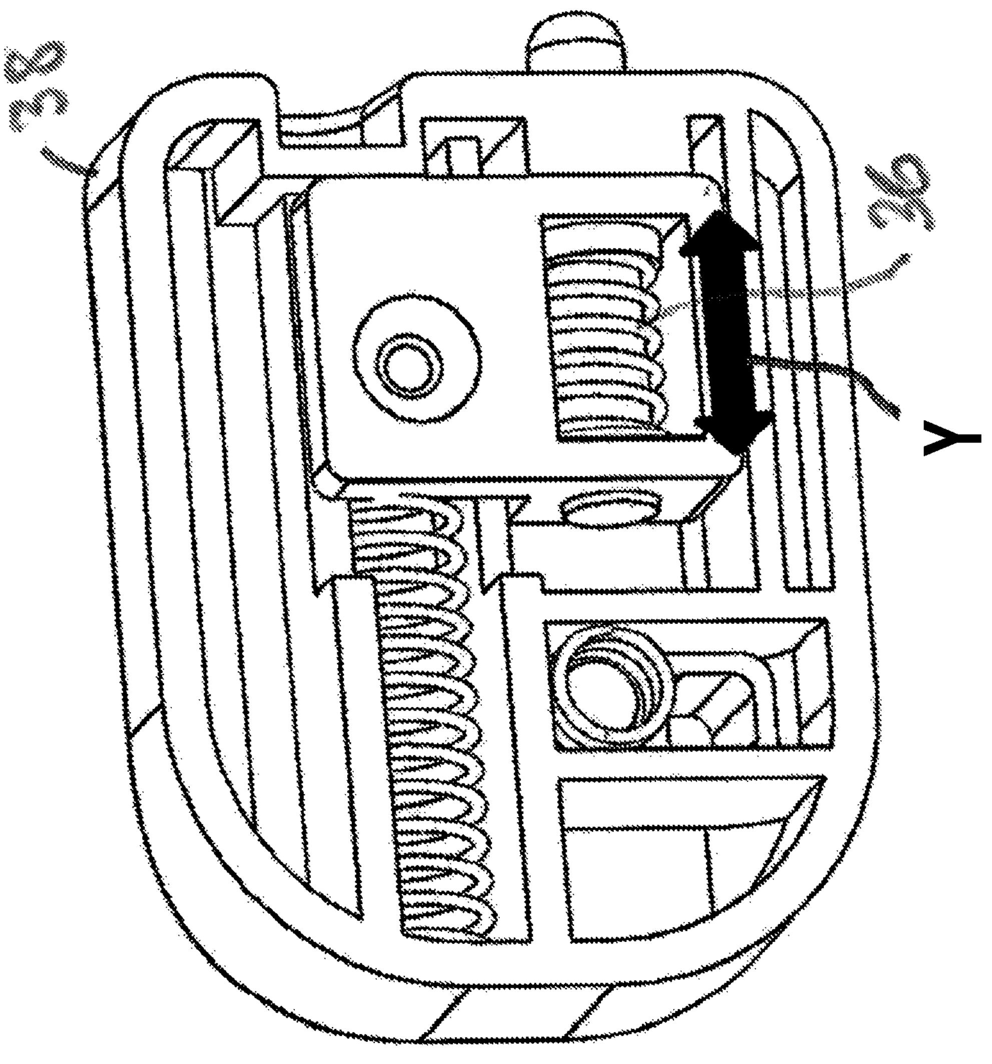
FIG. 17 shows a view of the interior of the lock mechanism of FIG. 11 with the unlocking means in a first position, from the opposite side to FIG. 15, and, FIG. 18 shows a view of the interior of the lock mechanism of FIG. 11 with the unlocking means in a second position, from the opposite side to FIG. 16.
Figure 18:
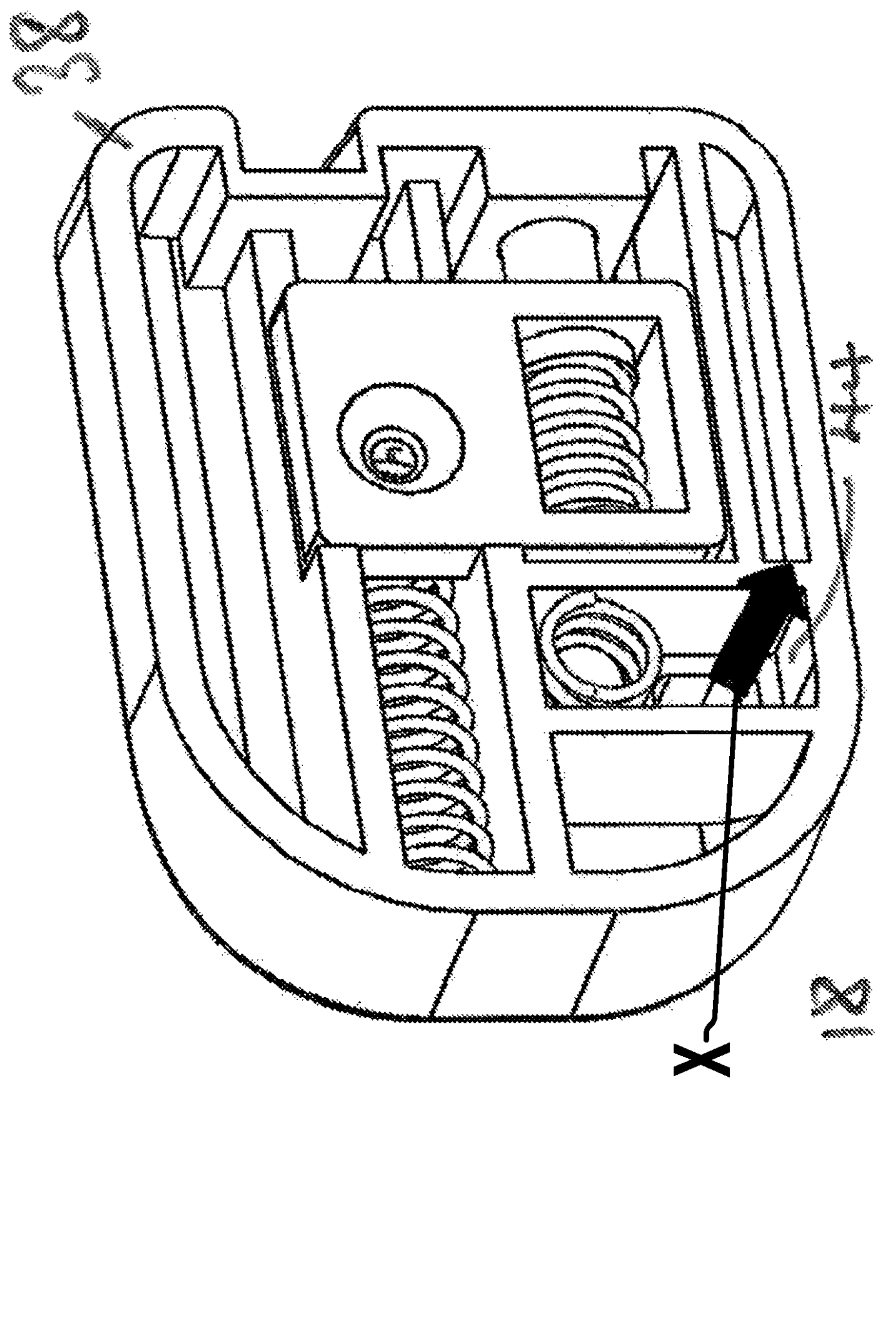

Thus as is shown in a step by step way in FIGS. 13A-13E and FIGS. 15 to 18, the locking peg 43 may be pressed inwardly by an adult user in the direction of Arrow X in FIG. 15, against the spring 47 to disengage the abutment arm 43*a* of the locking peg 43 from the abutting portion against the movable carriage 32 as shown in FIG. 13A. This permits the operable unlocking means 42 to be slidably moved by the adult user so disengaging the retractable rod 34, as shown in FIG. 13B and by the arrow y in FIG. 16. The operable unlocking means 42 can be held there by the user as shown in FIG. 13C, whilst the cupboard door is opened. FIGS. 17 and 18 show the corresponding steps X and Y from the opposite side of the lock mechanism housing 38. This two-step movement is significantly more difficult for a child to work out and yet is intuitive for an adult and the adult can be guided by instructions and by icons or arrows marked on the housing 38.

Figure 13D:
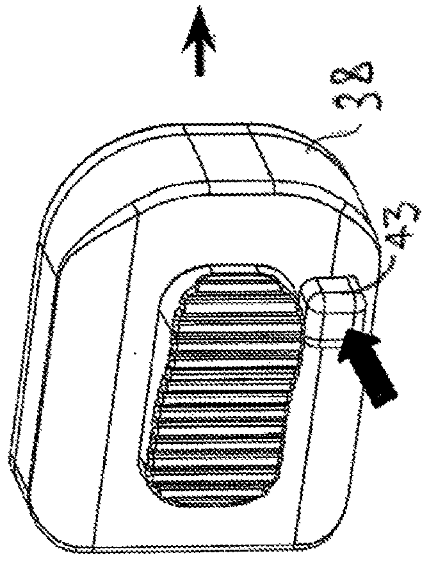
Figure 13E:
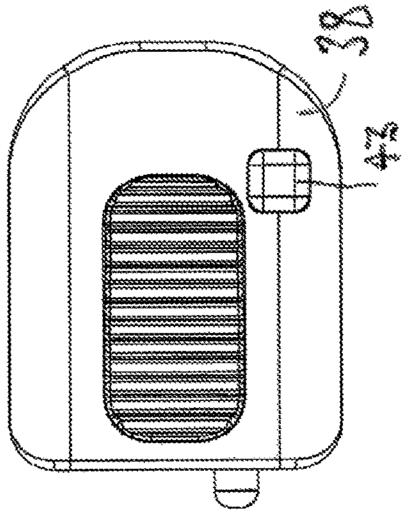
Figure 14:
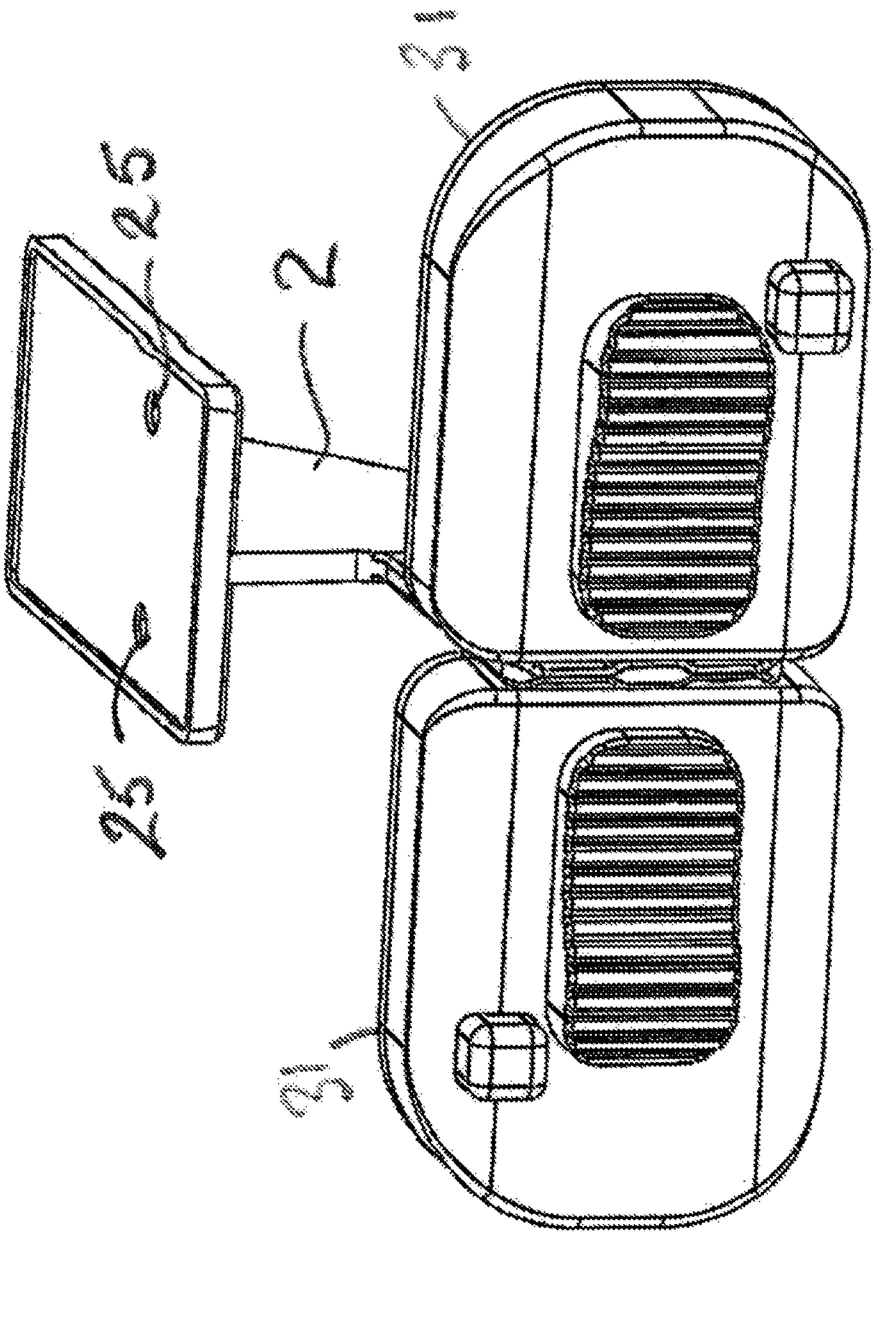
FIG. 14 shows a pair of lock mechanisms of the embodiment of FIG. 11.

When the operating button 42*a* has been slidable moved the abutting arm 43*a* of the locking peg 43 bears against a contacting surface of the moveable carriage 32 remaining out of abutment and permitting continued sliding of the operable unlocking means 42 by an adult user. When the user releases the operating button 42*a* however the spring 40 urges the operable locking means back to the locked position which moves the moveable carriage back to the locked position and spring 36 is free to urge the retractable rod 34 back out to the extended position, and the secondary lock spring 47 urges the locking peg 43 automatically back into the recess 44 as shown in FIG. 13D. In this way the lock is automatically reset to the safe and childproof position when the adult user has released the opening button 42*a*, as shown in FIG. 13E. The adult user can therefore remain confident that the childproof lock will be restored to the active locked status, once released.

It should be understood that although specific embodiments of the present invention have been described herein in detail, such descriptions are for purposes of illustration only and modifications may be made thereto within the scope of the invention.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

COMPONENT LIST

1. Latching means
2. Catching means
3. Cupboard frame
3*a*. Cupboard door
3*b*. Cupboard door
4. Retracting rod
4*a*. Catch engaging end
4*b*. Operating end
5. Recess
6. Spring
7. Cover
8. Housing
8*a*. Holes
9. Gear rack
10. Gearwheel
11. Shaft
12. User operable unlocking means/Operating button
13. Locking peg
14. Recess
15. Slider
16. Secondary lock button
17. Spring
18. Guides
19. Contacting surface
20. Additional recess
21*a*. Bevelled surface
21*b*. Bevelled surface
22. Securing plate
23. Indicator mark 24. Stops means
25. Holes
31. Latching means
32. Movable carriage
33. Shaft
34. Retracting rod
35. Recess
36. Spring
37. Cover
38. Housing
39. Flange
40. Spring
42. Operable unlocking means
42*a*. Operating button surface
43. Locking peg
43*a*. Abutment arm
44. Guide
47. Spring

The invention claimed is:

1. A child safety locking mechanism for a cupboard comprising first and second movable doors and a fixed frame, the child safety locking mechanism comprising first and second latching means and a catching means, the first and second latching means adapted to be secured on the outside of each of the cupboard doors and the catching means adapted to be secured to a part of the frame, the first and second latching means each comprising a retractable rod removably engageable in a corresponding recess in the catch means and retractable by a user operable unlocking means against the action of a spring which spring restores the retractable rod to the catch engaged position when the user releases the user operable unlocking means; and wherein the user operable unlocking means includes secondary locking means which normally prevents the operation of the user operable unlocking means and which must be unlocked before the user operable unlocking means can be operated, wherein the retractable rod includes a first catch engaging end and a second opposite operating end which includes a gear rack, the user operable unlocking means includes a user engaging surface and is connected by a shaft to a gear wheel which engages the gear rack to slidably move the retracting rod when the engaging surface of the user operable unlocking means is actuated by an adult user, and the secondary locking means includes a locking peg which is urged by a spring to engage in a recess in the user operable unlocking means, wherein the first and second latching means each comprise a receiving hole to receive the retractable rod of the corresponding second and first latching means and wherein the secondary lock means is operable adjacent to unlocking means of each corresponding first and second locking means so that the adult user may operate the locking mechanism with each hand operating simultaneously by releasing the secondary lock means with at least one digit and the unlocking means with at least one other digit of each hand.

2. The child safety locking mechanism according to claim 1, wherein the secondary locking means is unlocked by a rotating, sliding or pressing-in action, and corresponding the unlocking means may be released by a rotating, sliding or pressing in action, and that the direction movement required to unlock the secondary locking means is different to the direction of movement required to release the unlocking means.

3. The child safety locking mechanism according to claim 2, wherein the user operable unlocking means are unlocked by a rotating action.

4. The child safety locking mechanism according to claim 2, wherein the secondary locking means is unlocked by a sliding action such that, to the release the child safety locking mechanism, the user must first slide the secondary locking means and subsequently rotate the user operable unlocking means.

5. The child safety locking mechanism according to claim 4, wherein the locking peg is arranged to engage an additional recess provided on the user operable unlocking means and arranged in such a position that the user, could if it chose to do so, rotate the user operable unlocking means to this position in which the locking peg is aligned with the additional recess which has the effect of locking the user operable unlocking means in a position in which the retractable rod is retracted out of engagement with the recess in the catching means and the childproof lock is effectively disabled.

6. The child safety locking mechanism according to claim 2, wherein the first catch engaging end of the retractable rod includes an indication means which indicates to the user that the latching means is in the correct position in relation to the catching means during the fitting of the latching means or the catching means to the cupboard door or cupboard frame respectively.

7. The child safety locking mechanism according to claim 1, wherein the catching means includes a securing plate which includes screw holes or an adhesive layer to secure it to a cupboard frame.

8. The child safety locking mechanism according to claim 7, wherein the latching means includes stop means such that when user operable unlocking means is released by the user the retracting rod automatically returns to the locked position by the action of the spring and in this position the locking peg is aligned with the recess and is urged automatically into the recess by the action of the spring to automatically restore the latching means to the locked position when the user has released the user operable unlocking means.

9. The child safety locking mechanism according to claim 1, wherein the locking peg is arranged in a guide such that the locking peg is slidingly moveable by an adult user out of the locked position.

10. The child safety locking mechanism according to claim 1, wherein the user operable unlocking means includes a curved surface against which the locking peg bears whilst the user operable unlocking means is unlocked to maintain the locking peg, and consequently the secondary locking means, in the unlocked position.

11. A self-contained retrofittable lock, comprising:

a housing attachable to one of first and second movable doors of a cupboard;

first and second latching means adapted to be secured to a part of a frame of the cupboard;

a catching means contained in the housing and adapted to be secured on the outside of each of the first and second movable doors of the cupboard; and unlocking means including secondary locking means which normally prevents the operation of the unlocking means and which must be unlocked before the unlocking means can be operated, the secondary locking means including a locking peg which is urged by a spring to engage in a recess in the unlocking means;

wherein the first and second latching means each comprise a retractable rod removably engageable in a corresponding recess in the catch means and retractable by the unlocking means against the action of a spring which spring restores the retractable rod to the catch engaged position when an adult user releases the unlocking means, the retractable rod including a first catch engaging end and second opposite operating end which includes a gear rack; and wherein the unlocking means including a user engaging surface and is connected by a shaft to a gear wheel which engages the gear rack to slidably move the retracting rod when the engaging surface of the unlocking means is actuated by the adult user, the first and second latching means each comprising a receiving hole to receive the retractable rod of the corresponding second and first latching means and wherein the secondary lock means is operable adjacent to unlocking means of each corresponding first and second locking means so that the adult user may operate the locking mechanism with each hand operating simultaneously by releasing the secondary lock means with at least one digit and the unlocking means with at least one other digit of each hand.

12. The self-contained retrofittable lock according to claim 11, wherein the secondary locking means is unlocked by a rotating, sliding or pressing-in action, and corresponding the unlocking means may be released by a rotating, sliding or pressing in action, and that the direction movement required to unlock the secondary locking means is different to the direction of movement required to release the unlocking means.

13. The self-contained retrofittable lock according to claim 12, wherein the user operable unlocking means are unlocked by a rotating action.

14. The self-contained retrofittable lock according to claim 12, wherein the secondary locking means is unlocked by a sliding action such that, to the release the child safety locking mechanism, the user must first slide the secondary locking means and subsequently rotate the user operable unlocking means.

15. The self-contained retrofittable lock according to claim 12, wherein the first catch engaging end of the retractable rod includes an indication means which indicates to the user that the latching means is in the correct position in relation to the catching means during the fitting of the latching means or the catching means to the cupboard door or cupboard frame respectively.

16. The self-contained retrofittable lock according to claim 11, wherein the catching means, includes a securing plate which includes screw holes or an adhesive layer to secure it to a cupboard frame.

17. The self-contained retrofittable lock according to claim 16, wherein the latching means includes stop means such that when user operable unlocking means is released by the user the retracting rod automatically returns to the locked position by the action of the spring and in this position the locking peg is aligned with the recess and is urged automatically into the recess by the action of the spring to automatically restore the latching means to the locked position when the user has released the user operable unlocking means.

18. The self-contained retrofittable lock according to claim 11, wherein the locking peg is arranged in a guide such that the locking peg is slidingly moveable by an adult user out of the locked position.

19. The self-contained retrofittable lock according to claim 11, wherein the user operable unlocking means includes a curved surface against which the locking peg bears whilst the user operable unlocking means is unlocked to maintain the locking peg, and consequently the secondary locking means, in the unlocked position.

* * * * *